United States Patent [19]
Zhang

[11] Patent Number: 5,628,706
[45] Date of Patent: May 13, 1997

[54] METHOD AND ARRANGEMENT FOR CONTROLLING THE OUTPUT POWER OF A DRIVE UNIT OF A MOTOR VEHICLE

[75] Inventor: Hong Zhang, Bietigheim-Bissingen, Germany

[73] Assignee: Robert Bosch GmbH, Stuttgart, Germany

[21] Appl. No.: 560,485

[22] Filed: Nov. 17, 1995

Related U.S. Application Data

[63] Continuation of Ser. No. 140,463, Oct. 25, 1993, abandoned.

[30] Foreign Application Priority Data

Oct. 23, 1992 [DE] Germany .................... 42 35 827.2

[51] Int. Cl.$^6$ .................................................. B60K 41/02
[52] U.S. Cl. .................... 477/166; 477/169; 477/175
[58] Field of Search .................................... 477/109, 110, 477/174, 175, 176, 166, 168, 169

[56] References Cited

U.S. PATENT DOCUMENTS

| | | | |
|---|---|---|---|
| 4,353,272 | 10/1982 | Schneider et al. | 477/110 X |
| 4,663,714 | 5/1987 | Cornell et al. | 477/69 X |
| 5,036,728 | 8/1991 | Kawasoe et al. | 477/109 |
| 5,058,013 | 10/1991 | Iwatsuki et al. | 477/109 |
| 5,103,692 | 4/1992 | Shimanaka et al. | 477/109 |
| 5,307,270 | 4/1994 | Graf | 477/109 X |
| 5,325,740 | 7/1994 | Zhang et al. | 477/110 |
| 5,413,540 | 5/1995 | Streib et al. | 477/46 X |
| 5,417,625 | 5/1995 | Yamaki et al. | 477/109 |
| 5,443,594 | 8/1995 | Takada et al. | 477/111 X |
| 5,462,501 | 10/1995 | Bullmer et al. | 477/155 |
| 5,476,425 | 12/1995 | Shiraishi et al. | 477/109 |
| 5,483,939 | 1/1996 | Kamura et al. | 477/111 X |

*Primary Examiner*—Charles A. Marmor
*Assistant Examiner*—Peter Kwon
*Attorney, Agent, or Firm*—Walter Ottesen

[57] ABSTRACT

The invention is directed to a method and an arrangement for controlling the output power of a drive unit of a motor vehicle wherein a desired output torque command is determined on the basis of the driver command. A desired engine torque is computed from this desired output torque command while considering the torque transmission of a converter unit of an automatic transmission in all steady-state operating states. The converter unit is equipped with a controllable clutch. The desired engine torque is prepared by adjusting the output parameters of the engine.

11 Claims, 2 Drawing Sheets

METHOD AND ARRANGEMENT FOR CONTROLLING THE OUTPUT POWER OF A DRIVE UNIT OF A MOTOR VEHICLE

This is a continuation of application Ser. No. 08/140,463, filed on Oct. 25, 1993, now abandoned.

BACKGROUND OF THE INVENTION

A method and an arrangement for controlling the output power of a drive unit of a motor vehicle are disclosed in U.S. patent application Ser. No. 08/050,085, filed Apr. 28, 1993, now abandoned. Here, for the purpose of controlling the output power of a drive unit, a drive torque desired value is determined in dependence upon the driver command and, while computing a motor torque desired value, the motor torque is adjusted by influencing the power parameters of the motor for preparing an output torque corresponding to the desired value of the output torque. The motor torque desired value is determined from a characteristic field on the basis of the transmission ratio of the drive train (gear ratio of the transmission per se), of output torque desired value and of the measured output rpm. The computation of the desired motor torque is performed in that the output torque is made available independently of the gear stage into which the transmission has been shifted in accordance with the driver's command.

The following situation is presented for an automatic transmission having a converter having a controllable converter clutch (lockup clutch). The desired value of the output torque is determined from the output rpm and the accelerator pedal position and requires a certain desired torque at the transmission end of the converter (turbine wheel) in dependence upon the gear stage into which the transmission has been shifted. To obtain this desired turbine torque, a specific desired torque is required at the converter input (pump wheel) depending upon the adjusted torque transmission of the converter. The desired torque is that torque which is presented by the motor. Accordingly, and in order to obtain an output torque independently of the gear stage into which the transmission has been shifted and independently of the state of the converter, the torque transmission of the converter must be considered when determining the desired torque.

SUMMARY OF THE INVENTION

It is an object of the invention to provide improvements in a method and an arrangement for controlling the output power of the drive unit of a motor vehicle while considering the torque transmission of the converter when the torque to be supplied by the motor is adjusted.

U.S. Pat. No. 5,325,740, discloses measures for considering the state of the converter when the converter clutch is disengaged. However, these measures do not cover all states of the converter and the measures described there can especially not be applied when the converter clutch is controlled to a predetermined slippage.

In the following, the general information already known with respect to the electronic control of automatic transmissions having a converter equipped with a converter clutch is outlined. In the context of an automatic transmission, a converter has, as a rule, the task of amplifying torque especially for supporting the movement of a motor vehicle away from standstill and has the task of defining a clutch without torque conversion above an rpm threshold, that is, above a certain rpm threshold, the torque amplification of the converter is unity. The converter clutch always operates with a certain rpm slippage and therefore with losses. By engaging the converter clutch, the converter can be bridged so that a rigid through drive is produced. This rigid through drive would be desirable to avoid unnecessary losses; however, this through drive cannot be adjusted in all operating states because of reasons of comfort. Especially at low rpm, a noise would develop because of the converter when a rigid through drive is present which, in turn, would limit driving comfort. Also, the danger of vibrations in the drive train is present which would contribute to increased rough running. For these reasons, the converter clutch is controlled by presetting a desired rpm difference ns between an input and an output of the converter so that a predetermined slippage of the converter unit results which defines a compromise between loss minimization and an increase in comfort. The slippage is adjusted by controlling the converter clutch, for example, via a PI-controller in dependence upon operating variables such as gear stage position, load, driving program, et cetera. It should be noted that the increase in torque effected by the converter generally increases with increasing slippage, that is, when bridging occurs because of the clutch no amplification takes place.

The invention affords the advantage that the torque transmission can be determined via the converter unit even for a controlled converter clutch.

The consideration of the determined converter torque transmission is especially advantageous when computing the torque to be made available by the motor.

It is especially advantageous that the procedure provided by the invention makes possible the transmission of torque by means of the converter and the controlled converter clutch when converting an output torque desired value into a motor torque desired value by means of a precontrol strategy.

The computations to be made are furthermore considerably simplified.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
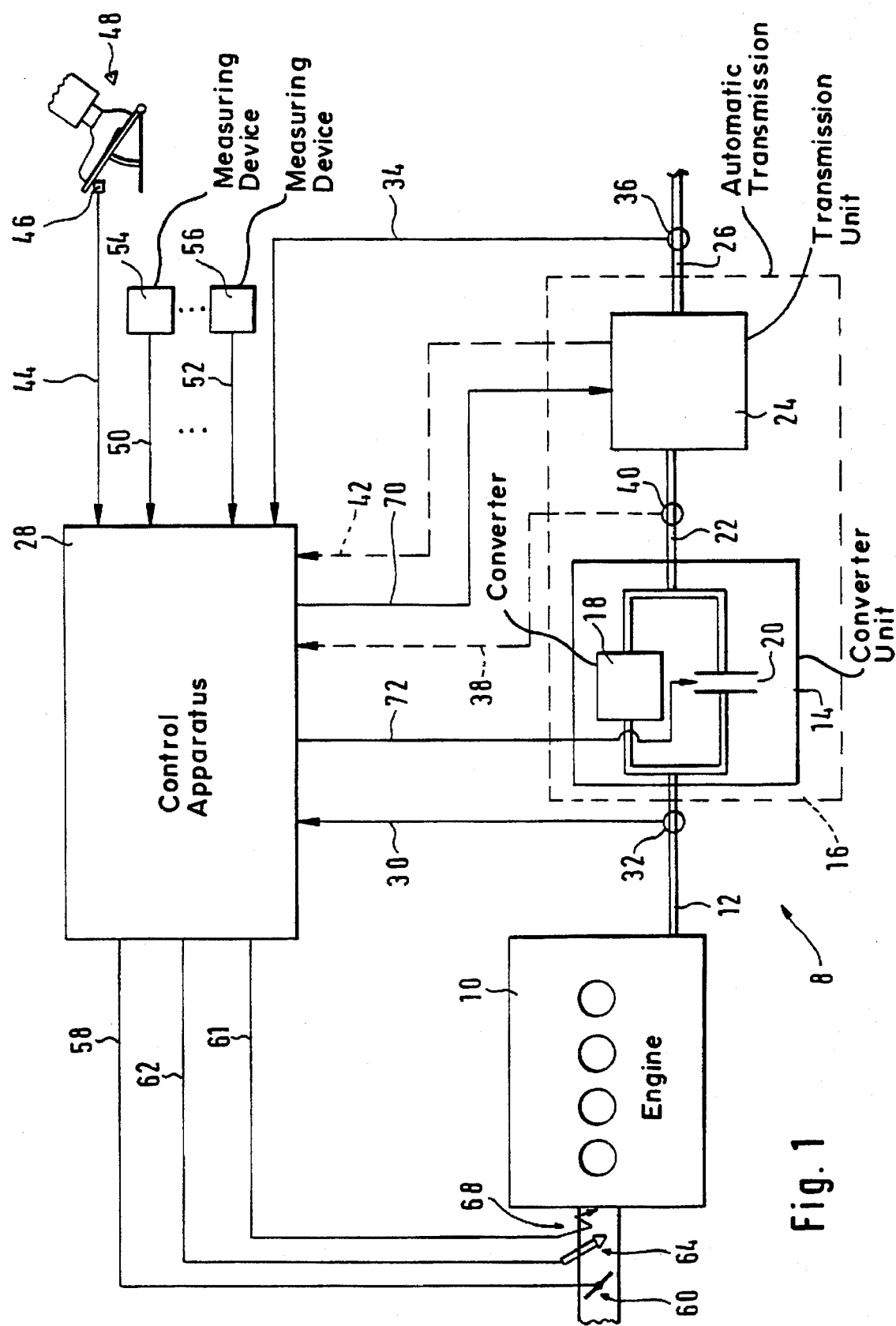
FIG. 1 is an overview block diagram of an arrangement of the invention for controlling the output power of a drive unit; and, FIG. 2 is a flowchart showing the method of the invention.

FIG. 1 shows an overview block diagram of an arrangement for controlling the output power of a drive unit which is exemplary of the arrangement according to the invention. The drive unit 8 includes a schematically illustrated engine 10 which includes an output shaft 12 in the form of a crankshaft which leads to a converter unit 14 of an automatic transmission 16. The converter unit 14 comprises a converter 18 which is connected in parallel to a controllable bridging clutch 20 (converter clutch). The shaft 22 of the converter unit 14 leads to the actual transmission unit 24 (input shaft 22 of the transmission unit 24) which, in turn, has an output shaft 26 which defines the output shaft of the drive train of the drive unit.

Various operating variables are supplied from the drive train to a control apparatus 28. A first input line 30 connects the control apparatus 28 to a sensor means 32 for detecting the rpm of the shaft for detecting the engine rpm; whereas, a line 34 connects the control apparatus 28 to a measuring device 36 for the rpm of the shaft 26 (the output rpm). In addition, and in a preferred embodiment of the invention, the input line 38 (shown as a broken line) is provided which connects the control apparatus 28 to a measuring device 40 for detecting the rpm of the shaft 22 which is the so-called turbine rpm. Also, and in a preferred embodiment of the invention, the input line 42 is provided which connects the control apparatus 28 to the transmission unit 24. In addition, the line 44 leads to the control apparatus 28 and connects the control apparatus 28 to a position transducer 46 of an element 48 actuable by the driver for detecting the driver command. Additional input lines 50 to 52 connect the control apparatus 28 to measuring devices 54 to 56, respectively, for detecting additional operating variables of the following: the engine 10, the drive unit and/or the motor vehicle itself. These additional variables include engine temperature, supply voltage, road speed, engine speed, et cetera.

The control apparatus 28 has several output lines for controlling the output power of the drive unit. A first output line 58 connects the control apparatus 28 to an electronically controllable actuating element 60 such as a throttle flap for influencing the air supplied to the engine 10 while the line 62 connects the control apparatus 28 to means 64 for controlling the metering of fuel. In addition, an output line 61 is provided which connects the control apparatus 28 to means 68 for adjusting the ignition time point. If the engine 10 is a diesel engine, then the control apparatus includes corresponding output lines for influencing the engine power while adapting to the specific requirements of the diesel engine. The same would apply to a two-stroke engine. The principal arrangement of the control of the output power can be applied in an advantageous manner also in combination with alternative drive systems such as electric motors wherein the control apparatus 28 includes the corresponding output lines for influencing the motor power.

The control apparatus 28 includes the output line 70 for controlling the automatic transmission 16. This output line 70 connects the control apparatus 28 to the transmission unit 24 for adjusting the transmission ratio of the automatic transmission. The automatic transmission 16 can be a continuously adjustable transmission or a transmission equipped with conventional transmission stages. In addition, the control apparatus 28 is connected via the line 72 to the converter clutch 20.

The control apparatus 28 forms an output desired torque based on the driver's command detected by the position transducer 46 of the driver-actuated element 48 and considers the output rpm of the drive unit detected by the rpm sensor 36 in forming this output desired torque. Alternatively, the output desired torque can be formed with the aid of wheel rpms and road speed. The output desired torque is made available at the shaft 26 by means of the drive unit in order to satisfy the command of the driver. This output desired torque is converted by the control apparatus 28 in a manner known per se into an optimal transmission ratio and a desired state of the converter clutch in dependence upon additional operating variables and a desired engine torque. The converter clutch can assume the states "engaged", "disengaged" and "controlled". The engine torque is made available on the basis of detected operating variables by adjusting the metering of fuel (for diesel engines) and the metering of air (spark-ignition engines) and/or, if required, the ignition time point at the crankshaft 12 of the engine 10 so that, together with the adjusted ratio, the desired output torque is available at the output shaft 26 of the drive unit.

The ratio of the transmission unit 24 as well as the torque transmission of the converter unit 14 must be considered when computing the desired engine torque from the output desired torque. Stated otherwise, the engine torque needed to produce the output torque desired value must consider the converter transmission adjusted as a consequence of this engine torque to be computed. An engine torque is necessary at the crankshaft 12 which must be weighted with the factor of the converter torque transmission compared to the turbine torque occurring at the input shaft of the transmission 22 depending upon the state of the converter. Accordingly, the converter torque transmission must be considered in order to guarantee a satisfactory control of the drive unit. This converter torque transmission is adjusted under given conditions when the output torque has reached its desired value. Here, only the steady-state case is considered.

The converter unit 14 of the automatic transmission 16 or its torque transmission can be controlled by the control apparatus 28. Here, the converter clutch 20 is controlled with the force transmission from the crankshaft 12 taking place to the transmission shaft 22 at the ratio of 1:1 for the completely engaged state; whereas, for a fully disengaged clutch, the torque transmission is determined exclusively by the converter 18. Intermediate states with reference to the torque transmission can be assumed by means of controlling the clutch for adjusting a specific rpm difference or an input/output-rpm ratio.

The measures for considering the torque transmission by the converter when computing the desired engine torque is based on the following.

An output torque command is computed from the output rpm (road speed) and the accelerator pedal position. From this, a required torque at the input shaft 22 of the transmission unit results in dependence upon the mechanical ratio of the gear stage of the transmission unit 24 into which the transmission unit has been shifted. This torque is referred to as the turbine torque in the following since it occurs at the output of the converter and, more specifically, at the turbine wheel of the converter. The pump wheel of the converter is rigidly connected to the crankshaft 12. Depending upon the rpm conversion ratio of the controlled converter clutch, a specific engine torque is then required in order to make available the desired turbine torque.

The converter unit 14 is shown with two parallel transmission channels (converter clutch 20 and converter 18) to make clear the occurring and computed torques and rpms. Accordingly, the following definitions are provided, namely, at the output end of the converter 18 facing toward the transmission, the turbine torque 1 (mturb1) occurs; whereas, at the output of the converter clutch 20 facing toward the transmission, the turbine torque 2 (mturb2) occurs; whereas, the sum of these two torques defines the turbine torque (mturb) on the shaft 22. Furthermore, at the engine end of the input shaft of the converter 18, the pump torque (mpump1) occurs and, at the engine end, the pump torque 2 (mpump2) occurs on the converter clutch 20. The sum of (mpump1) and (mpump2) corresponds to the pump torque (mpump). This pump torque corresponds to the engine torque (mmot) supplied by the engine. For a pregiven input/output desired rpm difference of the controlled converter clutch 20, the engine torque is determined in dependence upon the turbine torque and the turbine rpm based on the following relationships:

$$mturb = mturb1 + mturb2 \tag{1}$$

$$mpump = mpump1 + mpump2 \tag{2}$$

$$mpump1 = mturb1/fconverter(nue) \quad (3)$$

$$mpump2 = mturb2 \quad (4)$$

$$mpump1 = Kpt(nue) * nturb * nturb \quad (5)$$

$$nue = \frac{nturb}{ns + turb} \quad (6)$$

In the above equations, the following definitions apply: nturb=the turbine rpm; $\Delta$ns (nmot−nturb)=the desired rpm difference of the converter unit 14; nue=the desired rpm ratio of the converter unit; fconverter and Kpt=factors dependent upon rpm ratios.

The above factors fconverter and Kpt are determined experimentally as characteristic lines and are computed by interpolation in dependence upon the pregiven desired rpm ratio with fconverter representing the amplification of the converter 18 while Kpt defines a correction factor for computing the pump torque mpump1.

The computed pump torque mpump corresponds in the stationary case to the engine torque mmot. The equations used for the computations apply for positive, that is accelerating output torque commands as well as for negative, that is decelerating output torque commands.

A desired turbine torque is first determined on the basis of the actual transmission ratio when determining the desired engine torque required for making available the desired output torque determined on the basis of the driver's command. The desired engine torque is then computed from the desired turbine torque on the basis of the desired rpm ratio to be adjusted by the converter. This desired engine torque is made available by influencing the power parameters.

In this way, the torque transmission by the converter and the converter clutch can be considered in the context of a precontrol strategy when converting the output torque desired value into an engine torque desired value. Here, the direct computation of the sought-after engine torque is permitted from the turbine torque desired value and the turbine rpm in all states of the controlled converter clutch in steady-state operating ranges (except for shifting operations).

Figure 2:
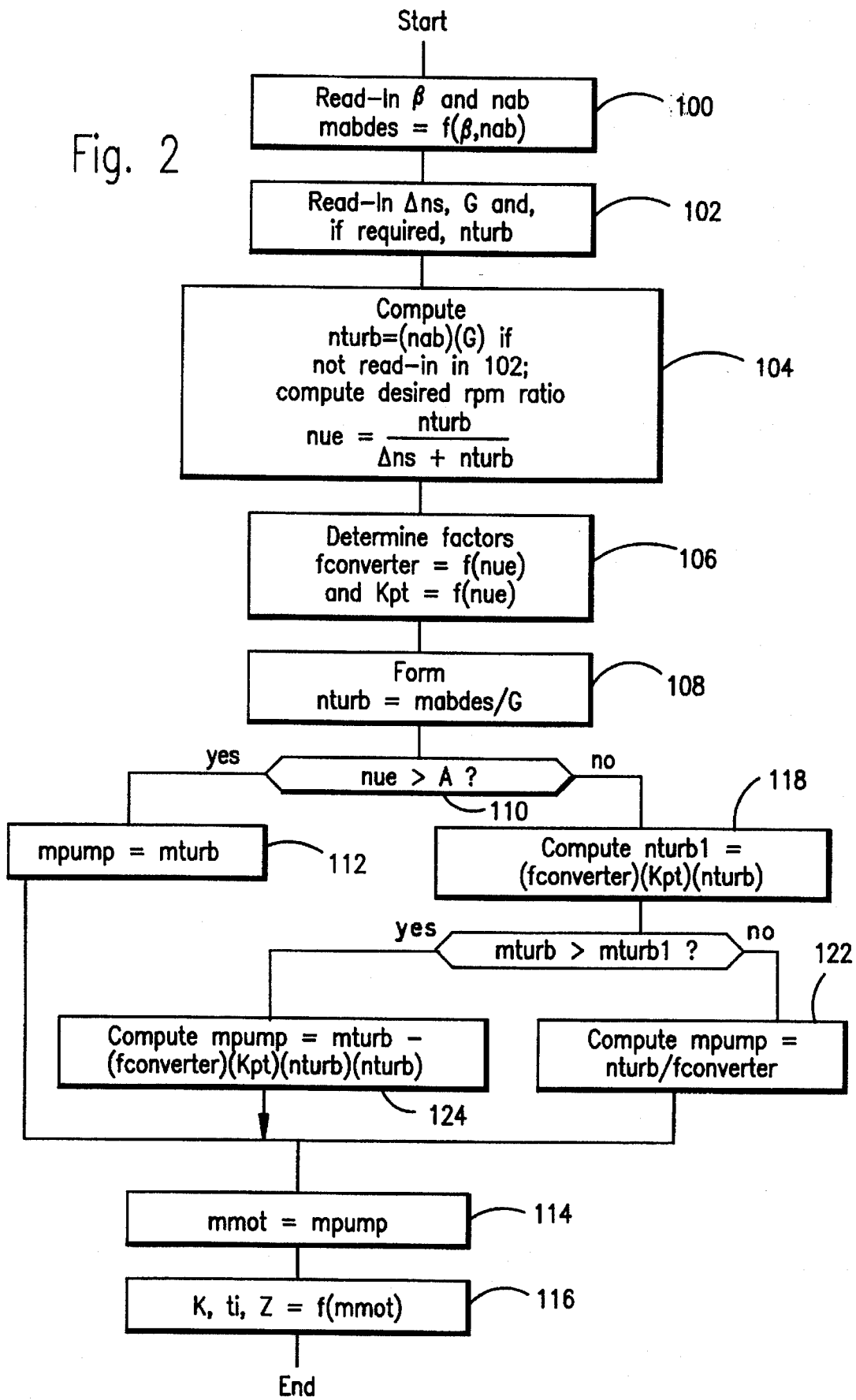

The method of the invention will now be explained with the aid of the flowchart shown in FIG. 2.

After the subprogram has started, the output rpm nab as well as the position $\beta$ of the driver-actuated element 48 are read-in in step 100 and the output torque desired value mabdes is computed on the basis of these values, for example, with the aid of a characteristic field. In addition, and if required, the transmission ratio to be adjusted and the desired rpm difference $\Delta$ns of the converter to be adjusted are determined. In step 102, additional values in the form of at least the rpm difference $\Delta$ns and the transmission ratio G are read in.

In a preferred embodiment of the invention, the transmission unit 14 includes a sensor and the turbine rpm nturb is read in. Thereafter, in step 104, for the case where no turbine rpm sensor is provided, the turbine rpm nturb is computed from the product of the output rpm nab and the adjusted transmission ratio G and the desired rpm ratio nue is computed from the desired rpm difference and nturb is also computed in step 104.

In step 106, which follows step 104, the factors fconverter and Kpt are determined on the basis of characteristic lines in dependence upon desired rpm ratio nue at the input and output of the converter unit. In the next step 108, the turbine desired torque mturb is formed as the quotient of the output torque command mabdes and the transmission ratio G.

In the next inquiry step 110, the desired rpm ratio is compared to a pregiven value A which corresponds in a preferred embodiment to the factor 0.86 and which defines an engaged converter clutch (rpm ratio approximately 1). If the rpm ratio exceeds this pregiven value, then the state of the converter is such that there is no longer any torque transmission. The factor fconverter is then set equal to 1. According to step 112, the pump torque results at the input of the converter while using the equations (1) to (6) equal to the computed desired turbine torque (mpump=mturb). In the steady state, and according to step 114, the desired pump torque is equal to the desired engine torque (mmot=mpump) which is made ready in step 116, for example, by adjusting the metered air K, the metered fuel ti and the ignition Z.

If it is recognized in step 110, that the rpm ratio is below the pregiven maximum value, then, in step 118, the output end turbine torque 1 mturb1 of the converter 18 is computed on the basis of the following equation:

$$mturb1 = fconverter(nue) * Kpt(nue) * nturb * nturb \quad (7)$$

Thereafter, in inquiry step 120, the total desired turbine torque mturb determined in step 108 is compared to the computed desired turbine torque 1. If the total turbine torque is below the computed value of the turbine torque 1, then this is an indication that the required desired rpm ratio is so low that no or only a negligibly small torque component is transmitted by the converter clutch (mpump2 approximately 0, mturb is set to mturb 1). For this reason, the desired pump torque mpump is computed in step 122 while considering the equations (1) to (7) from the quotient of the turbine torque mturb and the converter amplification fconverter. Thereafter, the desired engine torque is adjusted as described above in accordance with steps 114 and 116.

If, in accordance with step 120, the desired turbine torque drops below the computed value of the desired turbine torque 1, then in step 124, the desired pump torque (mturb) is computed in accordance with the following equation which is obtained by converting the equations (1) to (6):

$$mpump = mturb - (fconverter(nue) - 1) * Kpt(nue) * nturb * nturb \quad (8)$$

Thereafter, and in accordance with steps 114 and 116, the desired engine torque is made available by adjusting the output parameters of the engine.

Thereafter, the subprogram is ended and is again repeated at a pregiven time point.

It is understood that the foregoing description is that of the preferred embodiments of the invention and that various changes and modifications may be made thereto without departing from the spirit and scope of the invention as defined in the appended claims.

What is claimed is:

1. A method for controlling the output power of a drive unit of a vehicle, the drive unit including a motor and a power transmitting assembly connected to the output of the motor, the power transmitting assembly including a converter, a clutch bridging the converter and a transmission unit, the clutch being controllable so as to be in an open state, in a closed state and in an intermediate state between said open and closed states, the method comprising the steps of:

determining a desired output torque (mabdes) of said power transmitting assembly;

converting said desired output torque (mabdes) into a motor torque (mmot);

determining whether said clutch is in said intermediate state between said open and closed states;

while said clutch is in said intermediate state, computing said motor torque in accordance with the transmission gear ratio (G), said desired output torque (mabdes) and the torque transmitted by said converter and said clutch; and, adjusting said desired output torque (mabdes) of said power transmitting assembly by setting said computed torque.

2. An arrangement for controlling the output power of a drive unit of a vehicle, the drive unit including a motor and a power transmitting assembly connected to the output of the motor, the power transmitting assembly including a converter, a clutch bridging the converter and a transmission unit, said clutch being controllable so as to be in an open state, in a closed state and in an intermediate state between said open and closed states, the arrangement comprising:

an electronic control unit for determining a pregiven desired output torque (mabdes) of said power transmitting assembly and for converting said desired output torque (mabdes) into a motor torque (mmot);

said electronic control unit including means for determining whether said clutch is in said intermediate position and for computing the motor torque in accordance with the transmission gear ratio (G), said desired output torque (mabdes) and the torques transmitted by said converter and said clutch; and, said electronic control unit including means for adjusting said output torque (mabdes) by setting the computed motor torque.

3. The method of claim 2, further comprising the steps of:

deriving a turbine torque desired value from the driver command; and, determining the torque transmission of said converter unit on the basis of the turbine rpm and said turbine torque desired value.

4. The method of claim 3, further comprising the steps of:

forming an output torque command in dependence upon the driver command; and, computing the desired turbine torque at the output of the converter unit on the basis of said output torque command and the transmission ratio (G).

5. The method of claim 4, comprising the further step of controlling the slippage of said converter clutch in accordance with a pregiven rpm difference between the input and output rpms of said converter unit.

6. The method of claim 5, comprising the further step of computing the desired turbine torque at the output of said converter on the basis of the turbine rpm and factors dependent upon the rpm ratio between the input and output of said converter unit.

7. The method of claim 6, comprising the further step of computing the desired torque at the input of the converter unit on the basis of the desired turbine torque, the turbine rpm and the factors dependent upon the desired rpm ratio.

8. The method of claim 7, further comprising the step of computing the desired motor torque from the converter amplification factor (fconverter) and the desired turbine torque when the converter clutch is disengaged.

9. The method of claim 8, wherein the converter has an amplification of one and the desired motor torque corresponds to the desired turbine torque when the converter clutch is engaged and the rpm ratio is above a pregiven value.

10. The arrangement of claim 2, wherein said motor torque is made ready by influencing the throttle flap position and the fuel metered to the motor.

11. The arrangement of claim 2, wherein said motor torque is made ready by influencing the throttle flap position, the fuel metered to the motor and the ignition time point.

* * * * *

UNITED STATES PATENT AND TRADEMARK OFFICE
CERTIFICATE OF CORRECTION

PATENT NO. : 5,628,706
DATED : May 13, 1997
INVENTOR(S) : Hong Zhang

It is certified that error appears in the above-identified patent and that said Letters Patent is hereby corrected as shown below:

In column 1, line 52: delete "5,325,740," and substitute -- 5,325,740 -- therefor.

In column 5, lines 5 and 6: delete "$nue = \dfrac{nturb}{ns + turb}$" and substitute -- $nue = \dfrac{nturb}{ns + nturb}$ -- therefor.

In column 7, line 29: delete "claim 2," and substitute -- claim 1, -- therefor.

Signed and Sealed this

Twenty-ninth Day of December, 1998

Attest:

BRUCE LEHMAN

Attesting Officer

*Commissioner of Patents and Trademarks*